United States Patent
Berlin et al.

[19]

[11] Patent Number: 6,011,540
[45] Date of Patent: Jan. 4, 2000

[54] METHOD AND APPARATUS FOR GENERATING SMALL, OPTIMIZED COLOR LOOK-UP TABLES

[75] Inventors: Richard Berlin, Cupertino; James Graham, Sunnyvale, both of Calif.

[73] Assignee: Sun Microsystems, Inc., Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/829,462

[22] Filed: Mar. 28, 1997

[51] Int. Cl.[7] ........................................... G09G 5/02
[52] U.S. Cl. ..................... 345/153; 345/199; 345/431; 382/167
[58] Field of Search .................... 345/150, 154, 345/199, 153; 382/162, 167; 348/182

[56] References Cited

U.S. PATENT DOCUMENTS

| | | | |
|---|---|---|---|
| 5,365,252 | 11/1994 | Lo | 345/153 |
| 5,692,071 | 11/1997 | Govaert | 382/167 |

OTHER PUBLICATIONS

Apple Computer Inc., Technical Introduction to the Macintosh Family, Second Edition, pp. 200–204.

*Primary Examiner*—Steven J. Saras
*Assistant Examiner*—John G. Lim
*Attorney, Agent, or Firm*—Beyer & Weaver, LLP

[57] ABSTRACT

In a computer graphics windowing system including a color map, a method for managing palette color value contents of the color map. Input color values are received. Error values between each input color value and each palette color value are used to determine a closest palette color value to each input color value. A list of input color values having largest error value distances to their respective closest palette color values is determined. A subset of this list is added to the color map to derive a modified color map. A color value metric process for determining an error value between each input color value and each palette color value comprises converting each input color value and each palette color value to a uniform color space. A lightness weighting constant is used to skew the error value in to be more strongly influenced by differences in lightness than by differences in chromaticity. A look up table having address spaces indexed by RGB index color values is generated. Each address space of the look up table is filled with a color map address of the closest palette color value to the respective RGB index color value referencing the address space.

29 Claims, 6 Drawing Sheets

METHOD AND APPARATUS FOR GENERATING SMALL, OPTIMIZED COLOR LOOK-UP TABLES

BACKGROUND OF THE INVENTION

1. The Field of the Invention

The present invention relates to methods for managing a color look-up table which is shared by program applications in a computer system. More particularly, the present invention relates to a method of analyzing color values based on a quality metric which reflects human visual perception.

2. The Relevant Art

Computer operating systems are increasingly required to display vivid, color images for applications such as video creation and editing, image and graphics display and manipulation, and the presentation of "web pages", the documents obtained from servers on the World-Wide-Web. Examples of such operating systems include the X-Window System, the Macintosh operating system, and Microsoft Windows. Program applications which generate color images require the host computer graphics system to be capable of allocating a set of color values for displaying those images. Certain program applications, such as web browsers and drawing programs, generate images requiring particularly large sets of color values. However, many computer graphics systems provide only a limited number of color value choices in a memory space which must be shared by multiple program applications. Most window systems automatically allocate a core set of color values upon initialization of the window system. Additional sets of color values are then allocated by user program applications. It is the task of the window system to manage the color values available in the shared memory space to satisfy the requirements of each active program application.

Typical computer graphics systems include a display buffer for storing a picture definition to be displayed on a display device. The most common type of graphics display device is a raster scan display comprising a cathode ray tube (CRT) monitor. In raster scan graphics systems, a memory area called a frame buffer is used to store a set of color values for each screen point, or pixel, of the display. The range of color values for each pixel position depends on the capability of the raster system. Black and white systems require only one bit per pixel to control the intensity of screen positions. Additional bits per pixel are required when color and intensity variations can be displayed. A typical raster scan CRT monitor displays color pictures using a set of primary colors (e.g., red, green, and blue phosphors) each activated by a separate electron gun. A wide range of colors can be generated at a pixel by combining intensity varied emitted light from each of the primary colors. If a computer graphics system uses 8 bits to control the intensity of each primary color, there are a total of $2^{(8 \times 3)}$ possible color choices for display. However, the actual number of color choices available to a user is limited by the amount of storage provided in the frame buffer. Color information can be stored in a frame buffer either directly or indirectly using a color look-up table, also called a color map. In a color raster system using a color look-up table, frame buffer values are used as indices into one or more color look-up tables. Color look-up tables provide additional color choices to a user without requiring larger frame buffers.

The number of color choices available in a computer graphics system can be increased by using well known digital techniques for approximating halftones. Many such techniques include the use of pixel grid patterns to approximate halftones. Pixel grid patterns reduce the resolution of the display in favor of increasing the number of colors which can be displayed. Dithering and error diffusion are two additional common computer graphics techniques for approximating halftones. In dithering and error diffusion techniques, a reduced set of stored color values (a reduced color set) is used to generate a larger set of display color values. A critical step in digital halftoning techniques comprises determining an error value between a color value, to be displayed by digital half toning, and a color value in the reduced color set. Typically, the reduced color set values are arranged as points that comprise a cube. This arrangement simplifies mathematical operations required by the various digital halftoning techniques.

An example of such a color cube is shown in FIG. 1 at 100. The color cube 100 represents a red, green, blue ("RGB") color space which consists of three color components shown as axes: red, green, and blue. The color cube 100 includes uniformly spaced memory spaces, or slots, referenced by RGB coordinate values. The color cube 100 is a 6×6×6 color cube which is the largest color cube which can fit into a 256 element color look-up table. The coordinates for each color value of color cube 100 can be generated by dividing each color axis of a 256×256×256 color cube by 5.

Most dithering and error diffusion techniques include determining an error value, $\Delta$, between an RGB color value in the reduced color set and a display (RGB) color value using the simple Euclidean distance relationship below.

$$\Delta = \sqrt{(R_1 - R_2)^2 + (G_1 - G_2)^2 + (B_1 - B_2)^2}$$

where $R_1$, $G_1$, and $B_1$, are color components of a first color value and $R_2$, $G_2$, and $B_2$ are color components of a second color value. The error value is used to represent the difference between the first and second color values for purposes of human visual perception.

However, RGB color space is non-uniform. That is, a given distance between a first pair of color values in RGB color space can correlate to little perceptual difference to the human eye whereas the same distance between a second pair of color values can correlate to a great perceptual difference to the human eye. So, using the simple Euclidean formula in RGB color space to determine error values between color values does not provide an optimal quality metric for analyzing colors for purposes of human visual perception. Thus, the above described error value determination method, in the non-uniform RGB color space, for dithering or error diffusion of images results in poor quality image displays.

Therefore, a method of determining error values between colors is needed wherein the method provides optimal results for analyzing colors for purposes of human visual perception. Also, a method of managing a color look-up table based on an optimal color quality metric is needed in order to be able to display optimal full color images while allocating a minimum number of new color values in the color look-up table.

SUMMARY OF THE INVENTION

The present invention pertains to a method for managing a color look-up table which is shared by program applications in a window system. More particularly, the present invention relates to a method of analyzing color values based on a quality metric which accurately reflects human visual perception.

In one aspect, the present invention provides a computer implemented method for modifying a color map. In one embodiment, a number of palette color values, N, is added to the color map. The number N can be a user-defined parameter. The color map can be completely filled or slots of the color map can be left empty in order to allow space for other palette color values to be added later. It is then determined which of a set of input color values are most poorly represented, for purposes of human visual perception, by palette color values stored in the color map. The set of input color values can be received from a program application or the set of input color values can be an input red, green, blue ("RGB") color cube. A list of input color values most poorly represented by palette color values stored in the current color map is determined. A subset of the list of poorly represented input color values is added to the color map to derive an updated color map. The steps of determining the most poorly represented input color values and adding them to the current color map are iterative.

In another embodiment, a subprocess is provided for determining which of the set of input color values are most poorly represented, for purposes of human visual perception, by the palette color values stored in the color map. Each input color value, and each palette color value in the color map, is converted into a color value in CIELUV color space. Provided that the input color value is not gray (R=G=B), the error value between each input color value and each palette color value in the color map is determined according to the equation:

$$\Delta = \sqrt{\lambda(L_1^* - L_2^*)^2 + (u_1^* - u_2^*)^2 + (v_1^* - v_2^*)^2}$$

where $\Delta$ represents an error value between an input color value and a palette color value in the color map, and $\lambda$ is a lightness weighting constant to skew the error value, $\Delta$, to be more strongly influenced by differences in lightness than by differences in chromaticity. In one embodiment, $\lambda$ is determined empirically. In the case for which the input color value is gray (R=G=B), the error value between the input color value and any palette color value in the color map which is also gray is determined, according to one embodiment, using the equation:

$$\Delta = \sqrt{\lambda} |L_1^* - L_2^*|.$$

Based on the error metric provided by the relationships described above, a closest palette color value is determined for each input color value. According to one embodiment, a list is generated containing each input color value and each corresponding error value, $\Delta_{closest}$, between the input color value and the closest palette color value in the color map. The list is then sorted based on a set criteria to derive a worst subset of $\Delta_{closest}$ error values. The subset of input color values corresponding to the worst subset of $\Delta_{closest}$ values which is considered to be the most poorly represented set of input color values in the color map. This subset of input color values is added to the color map to derive an updated color map.

In still another embodiment, an RGB-indexed look-up table is built after the color map is modified. The RGB-indexed look-up table contains memory spaces, or RGB slots, which can be referenced by an RGB index color value. Each RGB slot is used to store a palette memory address of a palette RGB color value, fixed in the color map, which is closest to the RGB index color value referencing the corresponding RGB slot. Thus, given an RGB index color value, the RGB-indexed look-up table provides the address of a palette RGB color value, fixed in the color map, which is closest to the RGB index color value. To build the RGB look-up table a second RGB input color cube is provided. Each input color value, and each palette color value in the color map, is converted into a color value in CIELUV color space. An index error value between each RGB index color value and each palette color value in the color map is determined according to the equations described above. A palette color value in the color map which is closest, for purposes of human visual perception, to each RGB index color value is determined. Each RGB slot of the RGB-indexed look-up table is then filled with a palette memory address of a palette color value, fixed in the color map, which is closest to the RGB index color value indexing the RGB slot.

The RGB-indexed look-up table provides a mechanism for speeding up image processing. Using the RGB-indexed look-up table it is not necessary to perform further error determination operations to determine which palette color value in the modified color map is closest to the display color value when a display color value is provided by a program application. The RGB-indexed look-up table provides the address of the closest palette color value in the modified color map. Because the RGB-indexed look-up table is indexed by RGB values, it can be used by traditional dithering algorithms. Also, because the look up table is filled with closest colors, calculated in the CIELUV color space, the resulting palette will blend more smoothly according to the human eye.

These and other aspects and advantages of the present invention will become more apparent when the Description below is read in conjunction with the accompanying Drawings.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF SPECIFIC EMBODIMENTS

In the following detailed description of the present invention, a method for generating a small optimal color look-up table, numerous specific details are set forth in order to provide a thorough understanding of the present invention. However, it will be obvious to one skilled in the art that the present invention may be practiced without these specific details or by using alternate elements or processes. In other instances well known processes, procedures, components, and circuits have not been described in detail so as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system. Herein, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "processing", "measuring", "converting", "determining", "deriving" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission or display devices.

Figure 1:
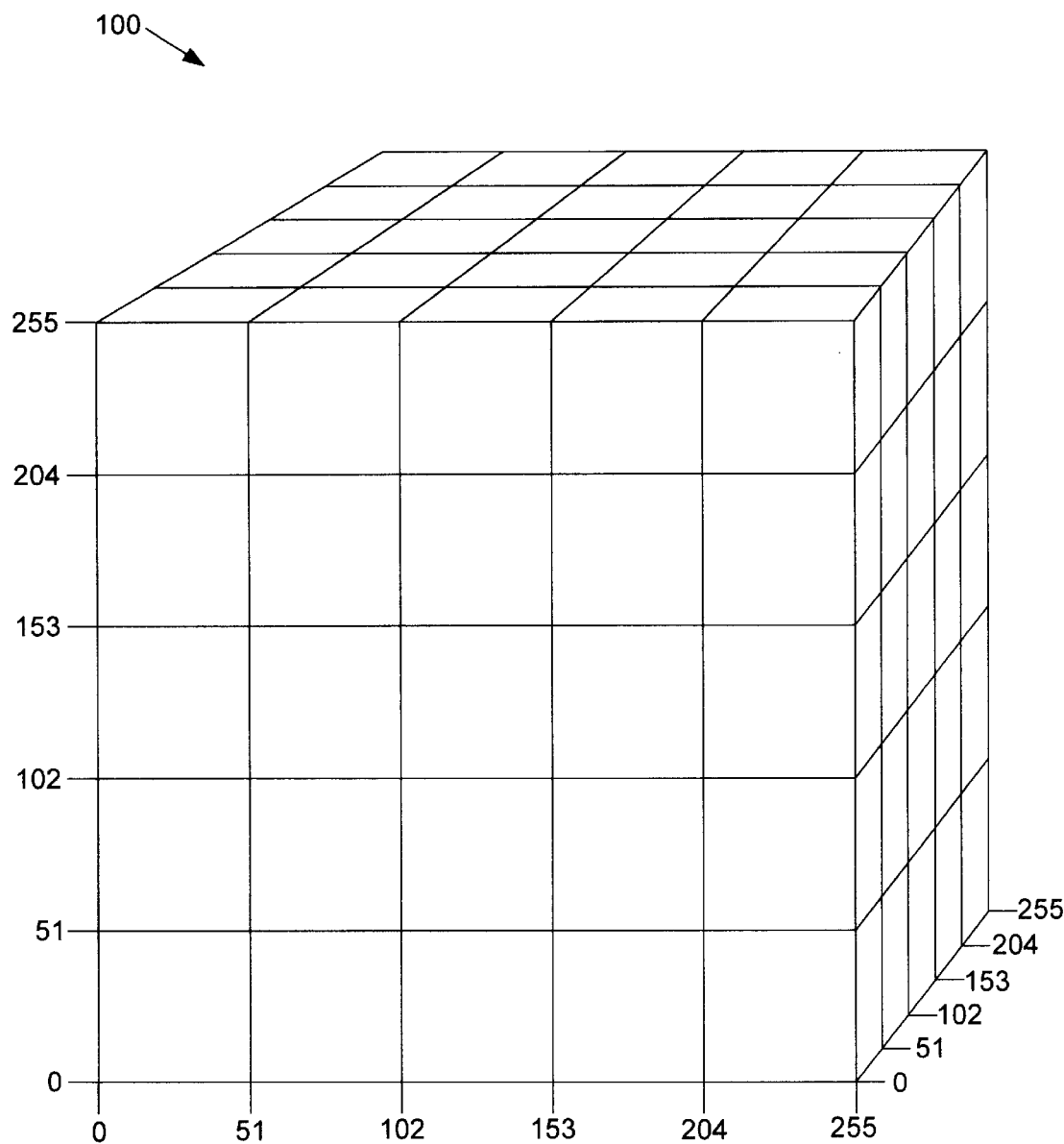
FIG. 1 is a diagram of a 6×6×6 color cube used in halftoning techniques.
Figure 2A:
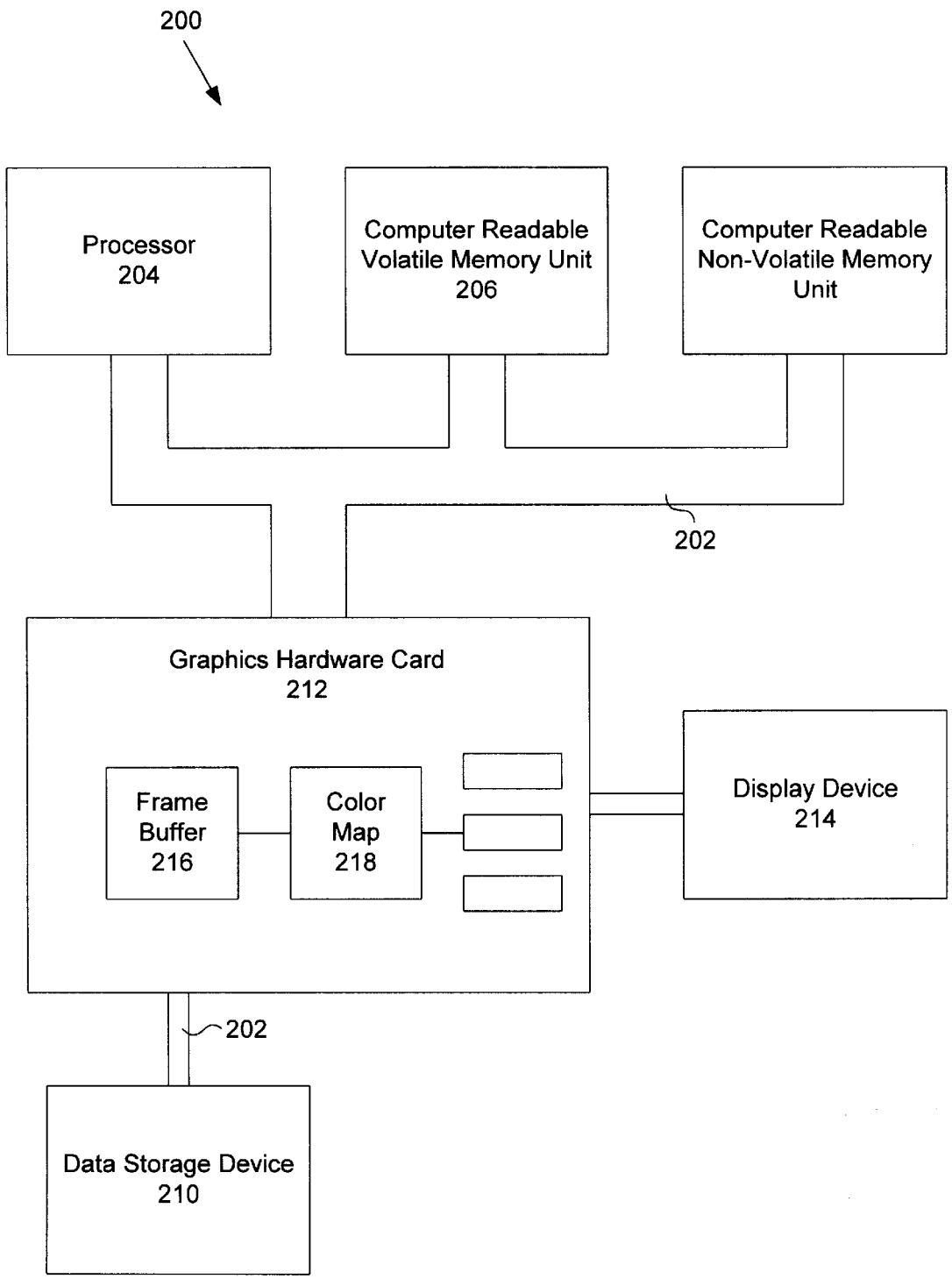
FIG. 2A is a block diagram of an exemplary computer system upon which the present invention may be implemented or practiced.

With reference to FIG. 2A, a block diagram is shown of a host computer system 200 used by an embodiment of the present invention. In general, the host computer system 200 comprises a bus 202 for communicating information, a host processor 204 coupled with the bus 202 for processing information and instructions, a computer readable volatile memory unit 206 (e.g., random access memory unit) coupled with the bus 202 for storing information and instructions for the host processor 204, a computer readable non-volatile memory unit 208 (e.g., read only memory unit) coupled with the bus 202 for storing static information and instructions for the host processor 204, a computer readable data storage device 210 (e.g., hard drive or floppy diskette) coupled with the bus 202 for storing information and instructions, a graphics hardware card 212 coupled with the bus 202 for processing display instructions and for storing graphics data, and a display device 214 coupled with graphics card 212 for displaying information to the computer user. Often this will be a color display. The display device 214 utilized with the computer system 200 of the present invention can be a liquid crystal device, cathode ray tube, or other display device suitable for creating graphic images and alphanumeric characters recognizable to a user. In a preferred embodiment of the present invention, the display device 214 is a raster scan monitor. The host computer system 200 provides data and control signals over the bus 202 to the graphics hardware card 212.

With reference still to FIG. 2A, the graphics hardware card 212 can contain a display processor (not shown) which executes a series of display instructions found within a display list. The processor 204 or the display processor supplies data and control signals to a frame buffer 216 which refreshes the display device 214, via a color map 218, for rendering images on the display device 214.

Figure 2B:
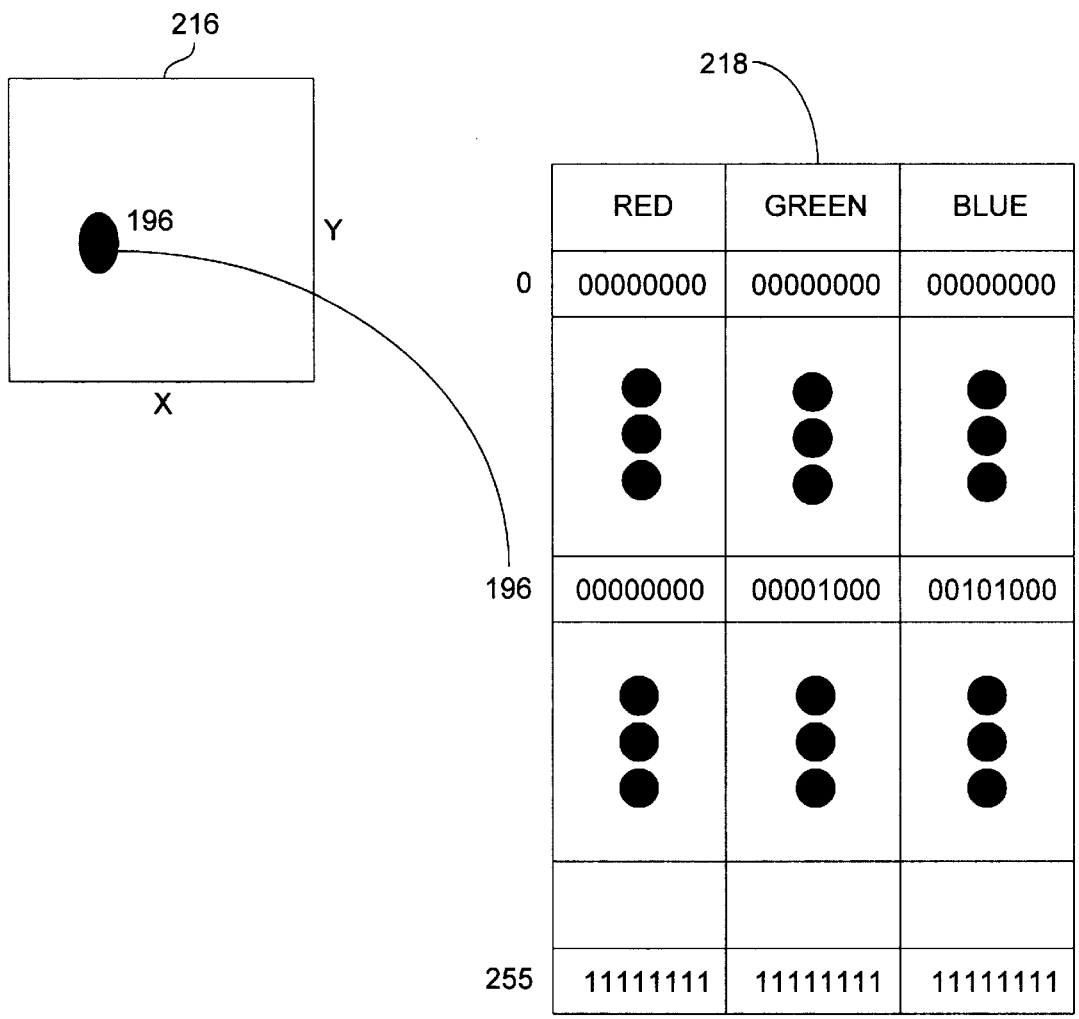
FIG. 2B is a memory space diagram of an exemplary frame buffer and display color look-up table used by the present invention.

With reference to FIG. 2B, a memory space diagram is shown of the frame buffer 216 and the color map 218 of FIG. 2A. In an embodiment of the present invention, the frame buffer contains 8 bits of data per pixel which are used to index 256 storage locations in the color map 218. Each storage location in the color map 218 contains a palette color value having 24 bits including an 8-bit byte for each of three color value components. The three color value components are the primary colors, red, green, and blue. It is understood in the present invention that other primary color values can be used. Each primary color value source is capable of $2^8$ or 256 variations in intensity. Because there are $2^8$ possible intensities for each primary color and there are three primary colors, there are $2^{24}$ possible color values. However, given an 8-bit-per-pixel frame buffer, only 256 of the $2^{24}$ possible color values can be loaded into the color map 218 by a window system.

In addition, color map 218 is a resource which can be shared by a plurality of program applications in a window operating system. Each program application can require a different set of palette color values for displaying images. Because the color map 218 can only store a limited number of palette color values, the palette color values allocated in the color map 218 must be managed by the operating system to optimally represent input color values required by program applications active in the window operating system.

Figure 3:
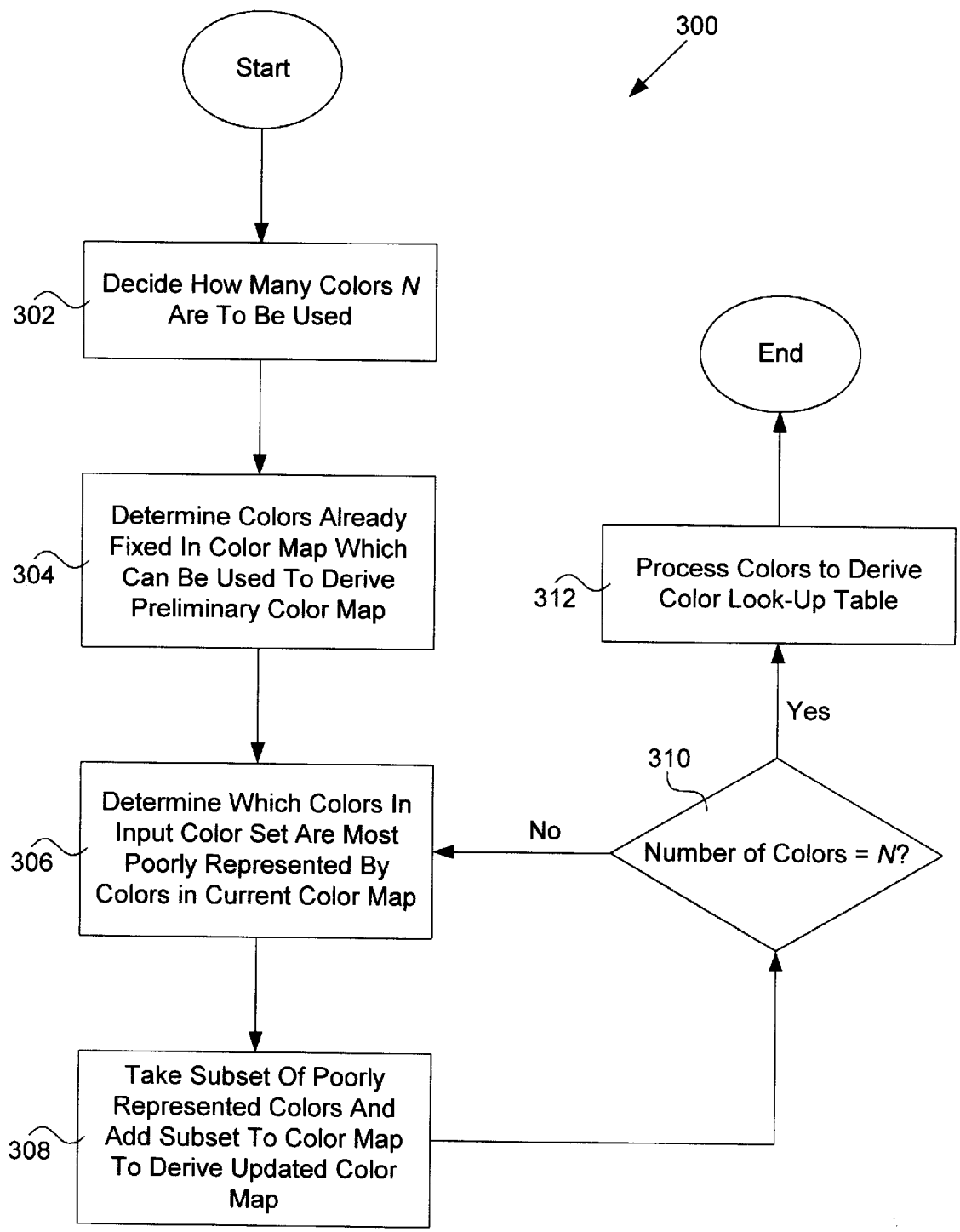
FIG. 3 is a flow diagram describing steps for implementing a process according to the present invention for managing a color look-up table.

FIG. 3 shows a flow diagram for implementing a process 300 according to one embodiment of the method of the present invention for managing the color map 218 of FIG. 2A. For example, process 300 can be executed over processor 204 of the host computer system 200 of FIG. 2A to add palette color values to the color map 218. Step 302 of process 300 determines a number of color values, N, which are to be processed by process 300. The number N determines how many palette color values are to be added to the color map 218. This number can be a user defined parameter. The color map 218 can be completely filled by process 300. Alternatively, slots of the color map 218 can be left empty in order to allow space for other palette color values to be added later upon activation of other program applications in the window system. In one embodiment, the number of color values N is determined by considering several factors, including, but not limited to: (1) a number of color values which currently active program applications can use, (2) characteristics of the window operating system used by the present invention, and (3) the number of palette color values stored in the color map prior to commencement of process 300. In one embodiment, N provides a stop criterion for steps in process 300 which add palette color values to the color map 218 as described below.

Step 304 of process 300 determines which, if any, palette color values are fixed in the color map 218 and can be shared by various applications. The criteria for this determination can vary according to the characteristics of the host windowing system. In one embodiment of the present invention, the host operating system indicates which palette color values are read only memory values thereby providing criteria for determining step 304. In this case, the read only memory values are considered to be fixed and sharable.

Step 306 of process 300 determines which of a set of input color values are most poorly represented, for purposes of human visual perception, by palette color values stored in the color map 218. The most poorly represented input color values are those which differ most, as perceived by the human eye, from the closest palette color value in the color map 218. In one embodiment of the present invention, the set of input color values is predefined by a program application. In this case, process 300 receives a set of predefined input color values which the program application can use for displaying images. In another embodiment of the present invention, the set of input color values can be a large set of color values which is likely to adequately provide for a program application which is not able to predefine color values which it can use for display. A web browser, for example, can require virtually any color value for displaying images due to the wide variety of color values in images generated by different web sites. In the case that the program application is unable to predefine a set of color values to be used in displaying images, step 306 of process 300 generates an input RGB color cube to be used as the input color set. In an embodiment of the present invention, each of the red (R), green (G), and blue (B) values used in the system is an eight bit value thus allowing for $2^{24}$ possible color values which can be used to generate a uniformly spaced 256× 256×256 RGB color cube. In one embodiment of the present invention, the RGB input color cube is a 32×32×32 uniformly spaced color cube. A 32×32×32 uniformly spaced color cube is easily generated by dividing each component of the uniformly spaced 256×256×256 RGB color cube by eight. The result is a 256×256×256 color cube in which every eighth slot is filled in for each color component. Such a cube requires $2^{15}$ or 32,768 memory addresses. As a second example, a 64×64×64 uniformly spaced color cube can be generated by dividing each component of a uniformly spaced 256×256×256 color cube by four.

Step 306 generates a list of input color values most poorly represented by palette color values stored in the current color map 218. The details of step 306 for determining which color values in the input color set are most poorly represented by palette color values in the color map 218 is described below in reference to a process 400 according to the present invention.

Step 308 takes a subset of the list of poorly represented input color values determined in step 306 and adds this subset of input color values to the color map 218 to derive an updated color map 218. As explained above, the list of color values determined in step 306 represents the input color values most poorly represented by the color values of the current color map 218. Therefore, steps 306 and 308 update the color map 218 to better represent the input color values.

Step 310 of process 300 determines whether the number of colors, N, has been reached. Provided that the number of colors, N, has not been reached, process 300 proceeds back through steps 306 and 308. By proceeding through steps 306 and 308 a plurality of times, process 300 iteratively determines which of the input color values are most poorly represented by palette color values in the repeatedly updated color map 218 and then repeatedly adds a subset of those poorly represented input color values to the color map 218 to derive an updated color map 218. Steps 306 and 308 can be iterated until the palette is completely full or until a desired number of memory spaces are filled as controlled by step 302 above which sets the value of N. Images dithered with the color map 218, as managed by process 300 of the present invention, display very good tone reproduction providing greater fidelity for a wide variety of continuous tone images.

With reference still to FIG. 3, provided that the number of colors, N, has been reached, the modification of color map 218 is complete and process 300 proceeds to step 312. Step 312 of process 300 builds an RGB-indexed look-up table. The RGB-indexed look-up table contains RGB slots which can be referenced by an RGB index color value (e.g., a display color value provided by a program application). Each RGB slot is used to store a palette memory address of a palette color value, fixed in the color map 218, which is closest to the RGB index color value referencing the corresponding RGB slot. So, given an RGB index color value, the RGB-indexed look-up table provides the index of a palette color value, fixed in the color map 218, which is closest to the RGB index color value. The RGB-indexed look-up table provides a mechanism for speeding up image processing. With the RGB-indexed look-up table, when a display color value is provided by a program application, it is not necessary to perform further error determination operations to determine which palette color value in the modified color map 218 is closest to the display color value. The RGB-indexed look-up table provides the index of the closest palette color value in the color map 218. The details of the process of building an RGB-indexed look-up table are described below in reference to a process 500 according to the present invention.

Figure 4:
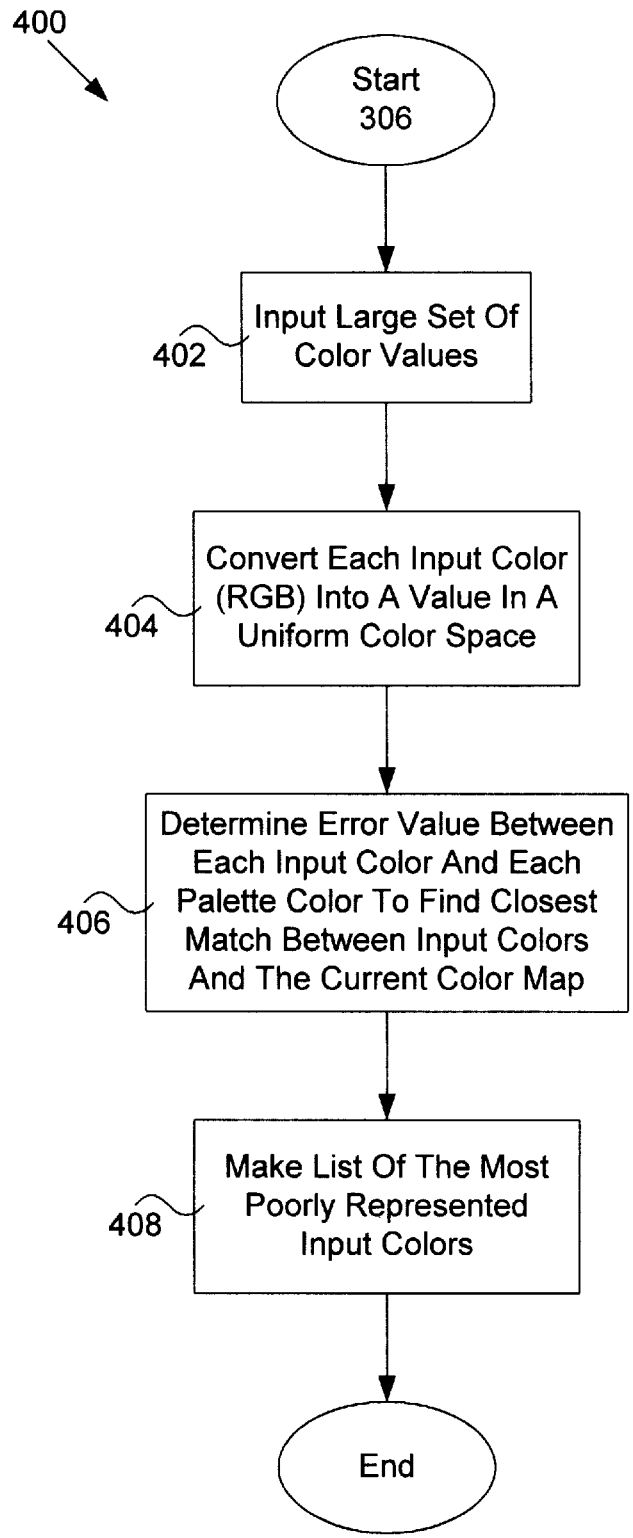
FIG. 4 is a flow diagram describing steps for implementing a process according to the present invention for determining which elements in a first set of color values are most poorly represented by elements in a second set of color values.

FIG. 4 shows a flow diagram for implementing a process 400 according to the method of the present invention for implementing step 306 of process 300 of FIG. 3. As stated above, step 306 determines which of a set of input color values are most poorly represented, for purposes of human visual perception, by palette color values stored in the color map 218.

With reference to FIG. 4, step 402 inputs a large set of color values. As previously described in the above discussion of step 306, the input color values can be a set of input color values provided by a user application or the input color values can be an input RGB color cube. In one embodiment of the present invention the input RGB color cube is a uniformly spaced 256×256×256 RGB color cube in which every eighth slot is filled-in to create a uniformly spaced 32×32×32 input RGB color cube.

With reference still to FIG. 4, step 404 of process 400 converts each input color value, and each palette color value in the color map 218, into a color value in a uniform color space. A uniform color space is one for which a given distance in the color space between a pair of color values correlates to an equal perceptual difference to the human eye for any pair of color values in the uniform color space. Examples of a uniform color space which can be used in the present invention include, but are not limited to CIE 1976 (L*u*v*) and CIE 1976 (L*a*b*), which are referred to herein as the "CIELUV" and "CIELAB" color spaces, respectively. In one embodiment of the present invention, the uniform color space is that known as the CIELUV color space. However, the CIELAB color space can be used in place of the CIELUV color space. Still other independent color spaces will be familiar to those of skill in the colorimetric arts. The CIELUV color space is a color space in which each color is represented by three component values: L*, u*, and v*. The "L*" component represents the lightness of the color value. The "u*" and "v*" components represent the chromaticity of the color value.

Step 406 of process 400 first determines an error value, e.g., in CIELUV color space, between each input color value and each palette color value in color map 218. Step 406 then determines, for each input color value, a palette color value in the color map 218 which is closest, for purposes of human visual perception, to the input color value. Provided that the input color value is not gray (R=G=B), the error value between each input color value and each palette color value in color map 218 is determined according to Relationship (1), according to the present invention, below.

$$\Delta = \sqrt{\lambda(L_1^* - L_2^*)^2 + (u_1^* - u_2^*)^2 + (v_1^* - v_2^*)^2} \quad (1)$$

where $L_1^*$, represents the lightness component of an input color value, $u_1^*$, and $v_1^*$, represent chromaticity components of an input color value. $L_2^*$ represents the lightness component of a palette color value in the color map 218. $u_2^*$ and $v_2^*$ represent chromaticity components of the palette color value in the color map 218. Relationship (1), above, is similar to the simple Euclidean function for determining a distance between two points in three-dimensional space. $\Delta$ represents an error value between an input color value and a palette color value in the color map 218. However, unlike the simple Euclidean distance function, Relationship (1) contains a lightness weighting constant, $\lambda$. According to one embodiment of the present invention, $\lambda$ is chosen such that the error value, $\Delta$, is more strongly influenced by lightness error and less influenced by chromaticity error because, when dithering, human visual perception is more sensitive to errors in lightness than to errors in chromaticity. In one embodiment, this lightness weighting constant is determined empirically. Typically, $\lambda$ is chosen to be between about 1.0 and about 100.0. In one embodiment of the present invention, $\lambda$ is about 10.0. In other embodiments of the present invention, $\lambda$ may be about 50.0 or about 8.0. Smaller values of N generally benefit from larger values of $\lambda$.

With reference still to step 406 of process 400 of FIG. 4, provided that the input color value is gray (R=G=B), the error value between an input color value and a palette color value in the color map which is also gray 218 is determined according to Relationship (2), below.

$$\Delta = \sqrt{\lambda} |L_1^* - L_2^*| \quad (2)$$

Relationships (1) and (2) above, provide a quality metric for analyzing a difference between color values. CIELUV color space is relatively uniform, as perceived by the human visual perception system. Therefore, computer implemented methods for digital halftoning, using the quality metric based on Relationships (1) and (2) display very good tone reproduction providing greater fidelity for a wide variety of continuous tone images.

After determining error values, $\Delta$, between each input color value and each palette color value, step 406 generates a list containing each input color value and each corresponding error value, $\Delta_{closest}$, between the input color value and the closest palette color value in the color map 218. For $\lambda=1.0$, a $\Delta$ value of less than about 3.0 corresponds to little perceptible difference between the color values; a $\Delta$ value of about 15.0 suggests a substantial perceptible difference between the color values.

Step 408 of process 400 determines a sub-list of input color values most poorly represented by palette color values in the color map 218. Step 408 evaluates the $\Delta$ table, derived from step 406 above, which contains each input color value and each corresponding error value, $\Delta_{closest}$, between the input color value and the closest palette color value in the color map 218. Step 408 then sorts through the set of $\Delta_{closest}$ error values based on a set criteria to derive a worst subset of $\Delta_{closest}$ error values in the list determined in step 406. The ordering function for the sort of step 408 can utilize other information in addition to, or instead of, the error value. In one embodiment, the lightness of the colors is considered in addition to the error value, with the darker colors being given a preference over the lighter colors. The criteria for determining the worst closest case values can also be a threshold value. For example, step 408 can choose each input color value having a corresponding $\Delta_{closest}$ error value above a certain threshold value. In an embodiment of the present invention, the list is sorted in descending order based on the quality metric provided by Relationships (1) and (2) above. After all of the colors have been evaluated, the first color value in the list (i.e., the one with the worst quality measure) is removed from the list and added to the color map 218. The rest of the colors in the list are then re-evaluated with respect to the newly added palette color value. Any colors which have improved so much that they are not as bad as the last element on the list are dropped while the others are resorted. The new first element is then treated the same way until the list is emptied or a stop criterion is met. The process of determining the worst case values is an iterative process.

Figure 5:
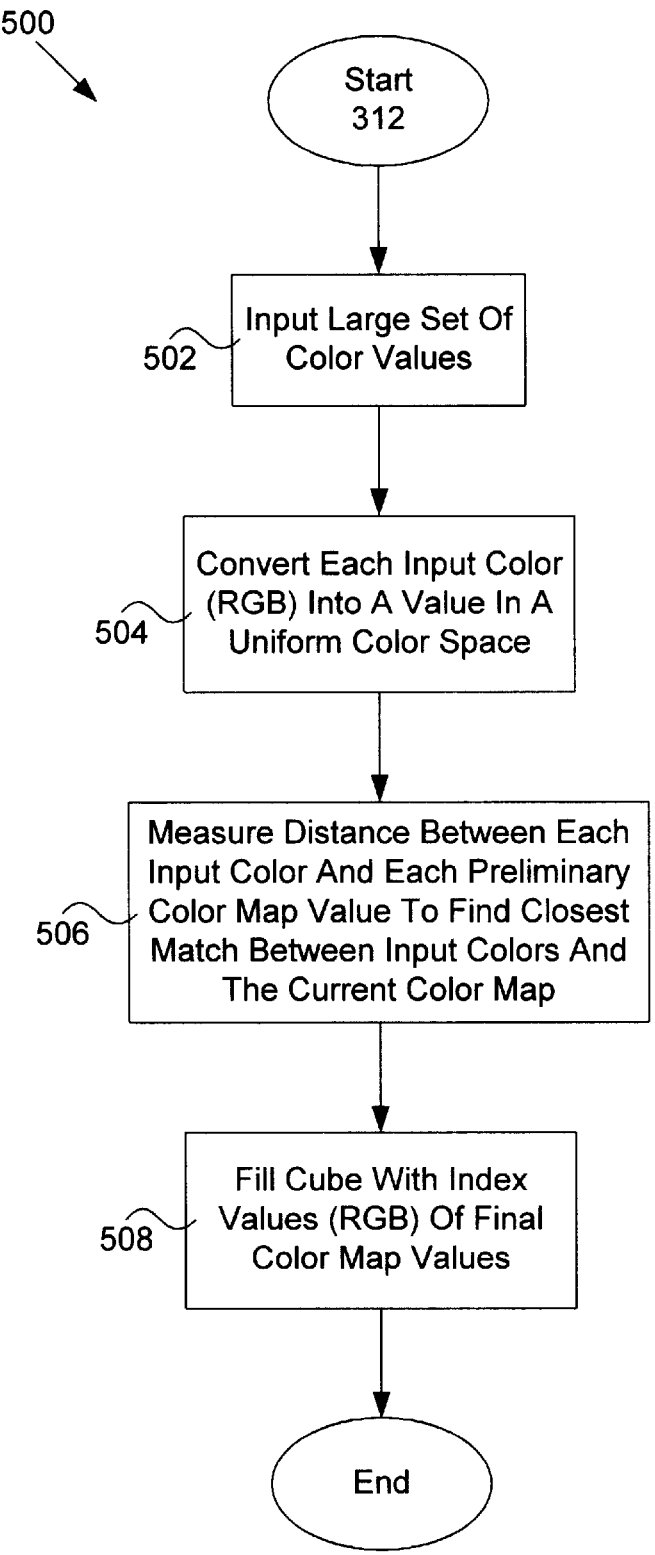
FIG. 5 is a flow diagram describing steps for implementing a process according to the present invention for building an RGB-indexed color look-up table according to the present invention.

FIG. 5 shows a flow diagram for implementing a process 500 according to the present invention for implementing step 312 of process 300 of FIG. 3. Step 312 of process 300 processes color values to build an RGB-indexed look-up table in main memory of the host computer system 200 of FIG. 2A. RGB index color values are used as indices into the RGB-indexed look-up table. The RGB-indexed look-up table contains RGB slots which are referenced by an RGB index color value. Each RGB slot is used to store a palette memory address of a palette RGB color value, fixed in the color map 218, which is closest to the RGB index color value indexing the RGB slot. So, given an RGB index color value (e.g., a display color value provided by a program application), the RGB-indexed look-up table provides the address of a palette RGB color value, fixed in the color map 218, which is closest to the RGB index color value. In a preferred embodiment of the present invention, 24-bit RGB index color values are used as indices into the RGB-indexed look-up table and an 8 bit pixel value is stored at each RGB slot. In this embodiment, given a 24-bit RGB index color value, the RGB-indexed look-up table provides an 8-bit pixel value, fixed in the color map 218, which is closest to the 24-bit RGB index color value.

With reference to FIG. 5, step 502 of process 500 inputs a large set of color values. Step 502 of process 500 is identical to step 402 of process 400. The input color values provide a set of RGB index color values to be used as indices into an RGB color look-up table. The input color values can be an input RGB color cube. In one embodiment of the present invention the RGB-indexed look-up table is generated using a uniformly spaced 256×256×256 RGB color cube in which every eighth slot is filled in to create a 32×32×32 address color look-up table. (In general, for color cubes having the dimensions $2^n \times 2^n \times 2^n$, each $m^{th}$ slot will be filled to create an address look-up table having the dimensions $2^n/m \times 2^n/m \times 2^n/m$.) Such an RGB-indexed look-up table can be generated by dividing each component of a uniformly spaced 256×256×256 color cube by 8. In another embodiment of the present invention, the dimensions of the RGB look-up table are 16×16×16. Such an RGB look-up table can be generated by dividing each component of a uniformly spaced 256×256×256 uniformly spaced cube by 16.

Step 504 of process 500 converts each RGB index color value, and each palette color value in the color map 218, into a color value in CIELUV color space according to well known methods. Step 504 of process 500 is identical to step 404 of process 400. Step 506 of process 500 determines the error value, Δ, in CIELUV color space, between each input color value and each palette color value in color map 218 according to Relationships (1) and (2) described above. Step 506 then determines a palette color value in the color map 218 which is closest, for purposes of human visual perception, to each RGB index color value.

Step 508 of process 500 fills in each RGB slot of the RGB-indexed look-up table with a palette memory address of a palette RGB color value, fixed in the color map 218, which is closest to the RGB index color value indexing the RGB slot.

The RGB-indexed look-up table provides a mechanism for speeding image processing. With the RGB-indexed look-up table, when a display color value is provided by a program application, it is not necessary to perform further error determination operations to determine which palette color value in the modified color map 218 is closest to the display color value. The RGB-indexed look-up table provides the palette address of the closest palette color value in the modified color map 218. Because the RGB-indexed look-up table is indexed by RGB values, it can be used by traditional dithering algorithms. Also, because the color map is filled with closest colors, calculated in the CIELUV color space, the resulting palette will blend more smoothly according to the human eye.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed:

1. In a computer system including a color map for storing device dependent color palette values suitable for use in a display device, a method for managing device dependent palette color value contents of the color map, the method comprising the computer-implemented steps of:

a) receiving input color values that are indicative of colors desired for display;

b) converting each of said input color values and each of said palette color values in the color map into a color value in a uniform color space to provide thereby a set of converted input color values and a set of converted palette color values in the uniform color space;

c) determining a distance between each of said converted input color values and an associated one of said converted palette color values in the uniform color space;

d) comparing said distances to a predetermined color error threshold distance to determine at least one converted input color value having an associated distance greater than a predetermined color error threshold distance; and e) adding said at least one device dependent palette color value corresponding to said converted input color value to said color map to derive thereby a modified color map.

2. The computer implemented method of claim 1 wherein said uniform color space is the CIELUV or the CIELAB color space.

3. The computer implemented method of claim 1 wherein said step of receiving input color values includes receiving input color values in the form a color cube.

4. The computer implemented method of claim 1 further comprising the computer-implemented steps of:

a) generating in the memory of said computer system a look-up table having memory address spaces indexed by the red, green, and blue (RGB) color coordinates of said input color values;

b) converting each of said RGB color coordinates of said input color values and each of said palette color values in the modified color map into a color value in a uniform color space;

c) determining an index error value between each converted RGB color coordinate for said input color value and each converted palette color value in the modified color map;

d) determining a closest palette color value to each converted RGB color coordinate based on said index error values; and e) filling each memory address of said look-up table with a color map address of the closest palette color value to the respective RGB color coordinate of each address space based on said index error value.

5. The computer implemented method of claim 4 wherein said step of generating a lookup table includes generating a 256×256×256 RGB color cube in which every eighth coordinate of said color cube corresponds to a memory address space for said look-up table.

6. In a computer graphics windowing system including a color map, a method for managing device dependent palette color value contents of the color map, the method comprising the computer implemented steps of:

a) receiving input color values that are indicative of colors desired for display;

b) converting each of said input color values and each of said device dependent palette color values in the color map into a color value in CIELUV color space to provide thereby a set of converted input color values and a set of converted palette color values in CIELUV color space;

c) determining an error value between each CIELUV converted input color value and each CIELUV converted palette color value;

d) determining a closest palette color value to each input color value based on said error values;

e) determining a list of input color values having error value distances to said closest palette color values greater than a predetermined error value; and f) using a subset of said list of input color values having error value distances greater than said predetermined error value to derive thereby a modified color map.

7. The computer implemented method of claim 6 wherein said step of determining an error value, between each CIELUV converted input color value and each CIELUV converted palette color value, comprises the computer implemented steps of:

a) squaring difference values between respective L*, u*, and v* components of said input color value and said palette color value to determine a squared L* difference value, a squared u* difference value, and a squared v* difference value;

b) determining a weighted lightness difference value by determining a product of said squared L* difference value and a lightness weighting constant; and c) determining a square root of a sum of said weighted lightness difference value, said squared u* difference value, and said squared v* difference value to yield said error value.

8. The computer implemented method of claim 6 wherein said step of determining an error value, between each CIELUV converted input color value and each CIELUV converted palette color value, comprises the computer implemented steps of:

a) provided said input color is not gray,
   i) squaring difference values between respective L*, u*, and v* components of said input color value and said palette color value to determine a squared L* difference value, a squared u* difference value, and a squared v* difference value,
   ii) determining a weighted lightness difference value by determining a product of said squared L* difference value and a lightness weighting constant, and
   iii) determining a square root of a sum of said weighted lightness difference value, said squared u* difference value, and said squared v* difference value to yield said error value between said input color value and said palette color value; and b) provided said input color is gray,
   i) determining a difference value between respective L* components of said input color value and said palette color value, and
   ii) determining said error value by generating a product of said L* difference value and a lightness weighting constant.

9. The computer implemented method of claim 6 wherein said step of receiving input color values includes receiving input color values predefined by a program application being executed on said computer system.

10. The computer implemented method of claim 6 wherein said step of receiving input color values includes receiving input color values in the form an input RGB color cube.

11. The computer implemented method of claim 6 further comprising the computer implemented steps of:

a) generating a look-up table having address spaces indexed by RGB index color values;

b) converting each of said RGB index color values and each of the palette color values in the modified color map into a color value in CIELUV color space;

c) determining an index error value between each CIELUV converted RGB index color value and each CIELUV converted palette color value in the modified color map;

d) determining a closest palette color value to each RGB index color value based on said index error values; and e) filling each address space of said look-up table with a color map address of the closest palette color value to the respective RGB index color value of each address space.

12. The computer implemented method of claim 11 wherein said step of generating a lookup table includes generating a 256×256×256 RGB color cube in which every eighth slot provides a memory space.

13. The computer implemented method of claim 7 wherein said lightness weighting constant is between about 1.0 and 100.0.

14. The computer implemented method of claim 13 wherein said lightness weighting constant is between about 10.0 and about 50.0.

15. A computer implemented method for determining an error value between a first color value and a second color value, said method comprising the computer implemented steps of:

a) converting each of the first and second color values into CIELUV color values;

b) provided said input color value is not gray,
   i) squaring difference values between respective L*, u*, and v* components of said first and second color values to determine a squared L* difference value, a squared u* difference value, and a squared v* difference value,
   ii) determining a weighted lightness difference value by determining a product of said squared L* difference value and a lightness weighting constant, and
   iii) determining a square root of a sum of said weighted lightness difference value, said squared u* difference value, and said squared v* difference value to yield the error value between; and c) provided said input color value is gray,
   i) determining a difference value between respective L* components of said input color value and said palette color value, and
   ii) determining said error value by generating a product of said L* difference value and a lightness weighting constant.

16. The computer implemented method of claim 15 wherein said lightness weighting constant is between about 1.0 and about 100.0.

17. The computer implemented method of claim 16 wherein said lightness weighting constant is between about 10.0 and about 50.0.

18. A computer system comprising a host processor coupled to a bus, physical memory coupled to said bus, a color map containing device dependent palette color values stored in said physical memory, and a display screen, comprising:

a) a color map receiver configured to receive at least one input color value indicative of a color desired for display from an application being executed on said computer system;

b) a color space converter that is configured to convert each of said input color values and each of the palette color values in the color map into a color value in a uniform color space to provide thereby a set of converted input color values and a set of converted palette color values in the uniform color space;

c) a color error measurement mechanism configured to determine an error value between each of said converted input color values and each of said converted palette color values;

d) a comparator for determining a closest palette color value to each input color value based on said error values and generating a list of input color values having error value distances to their respective closest palette color values larger than a predetermined threshold error value; and e) a color map augment or that uses a subset of said list of input color values to add at least one device dependent palette color value to said color map to produce thereby an augmented color map.

19. The computer system of claim 18 wherein said uniform color space is the CIELUV color space and said error measurement mechanism is configured to a) square the difference values between respective L*, u*, and v* components of said input color value and said palette color value to determine a squared L* difference value, a squared u* difference value, and a squared v* difference value;

b) determine a weighted lightness difference value by determining a product of said squared L* difference value and a lightness weighting constant; and c) determine a square root of a sum of said weighted lightness difference value, said squared u* difference value, and said squared v* difference value to yield said error value.

20. The computer system of claim 18 wherein said input color values are in the form an input red, green, and blue (RGB) color cube.

21. The computer system of claim 20 wherein said color space converter is configured to a) generate a look-up table having address spaces indexed by RGB color values; and b) convert each of said RGB color values and each of the palette color values in the modified color map into a color value in CIELUV color space.

22. The computer system of claim 21, wherein said color error measurement mechanism is configured to a) determine an index error value between each CIELUV converted RGB index color value and each CIELUV converted palette color value in the modified color map;

b) determine a closest palette color value to each RGB index color value based on said index error values; and c) fill each address space of said look-up table with a color map address of the closest palette color value to the respective RGB index color value of each address space.

23. The computer system of claim 22 wherein said input color values are stored in memory locations of said computer system corresponding to a 256×256×256 RGB color cube in which every eighth coordinate of said color cube corresponds to a memory address.

24. A computer-readable medium having a color map containing device dependent palette color values, said computer-readable medium having embedded thereon computer readable program code devices configured to cause a computer to perform the steps of:

a) receiving input color values that are indicative of a color desired for display;

b) converting each of said input color values and each of said palette color values in the color map into a color value in a uniform color space to provide thereby a set of converted input color values and a set of converted palette color values in the uniform color space;

c) determining a distance between each of said converted input color values and each of said converted palette color values in the uniform color space;

d) comparing said distances between said converted input color values to said converted palette color values in the uniform color space to determine at least one converted input color value having a distance greater than a predetermined color error threshold distance; and e) adding at least one device dependent palette color value corresponding to said at least one converted input color value to said color map to derive thereby a modified color map.

25. The computer-readable medium of claim 24 wherein said uniform color space is a CIELUV color space.

26. The computer-readable medium of claim 25 wherein said computer-readable program code devices are configured to receive input color values in the form of a color cube.

27. The computer-readable medium of claim 26 wherein said computer-readable program code devices are configured to perform steps of:

a) generating in the memory of said computer system a look-up table having memory address spaces indexed by the red, green, and blue (RGB) color coordinates of said input color values;

b) converting each of said RGB color coordinates of said input color values and each of said palette color values in the modified color map into a color value in a uniform color space;

c) determining an index error value between each converted RGB color coordinate for said input color value and each converted palette color value in the modified color map;

d) determining a closest palette color value to each converted RGB color coordinate based on said index error values; and e) filling each memory address of said look-up table with a color map address of the closest palette color value to the respective RGB color coordinate of each address space based on said index error value.

28. The computer-readable medium of claim 24 wherein said computer-readable program code devices are configured to generate a 256×256×256 RGB color cube in which every eighth coordinate of said color cube corresponds to a memory address space for said look-up table.

29. In a computer system including a color map for storing device dependent color palette values suitable for use in a display device, a method for managing device dependent palette color value contents of the color map, the method comprising the computer-implemented steps of:

a) receiving input color values that are indicative of colors desired for display by the display device;

b) converting each of said input color values and each of said device dependent palette color values in the color map into a color value in a uniform color space to provide thereby a set of converted input color values and a set of converted palette color values in the uniform color space;

c) for each of said converted input color values determining a distance between the converted input color value and a closest converted palette color value in the uniform color space;

d) identifying at least one poorly represented input color value based on the determined distances in the uniform color space; and e) adding at least one new device dependent color palette value to the color map to represent at least one said poorly represented input color value.

* * * * *